(12) United States Patent
Rethaber

(10) Patent No.: US 10,820,497 B2
(45) Date of Patent: Nov. 3, 2020

(54) MOWING HEAD FOR A TRIMMER

(71) Applicant: Andreas Stihl AG & Co. KG, Waiblingen (DE)

(72) Inventor: Achim Rethaber, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 94 days.

(21) Appl. No.: 16/378,596

(22) Filed: Apr. 9, 2019

(65) Prior Publication Data

US 2019/0230851 A1 Aug. 1, 2019

Related U.S. Application Data

(62) Division of application No. 15/218,139, filed on Jul. 25, 2016, now abandoned.

(30) Foreign Application Priority Data

Aug. 12, 2015 (DE) .......................... 10 2015 010 579

(51) Int. Cl.
*A01D 34/416* (2006.01)
*A01D 34/73* (2006.01)
*A01D 34/90* (2006.01)

(52) U.S. Cl.
CPC ....... *A01D 34/4166* (2013.01); *A01D 34/733* (2013.01); *A01D 34/90* (2013.01)

(58) Field of Classification Search
CPC ... A01D 34/90; A01D 34/4166; A01D 34/733
USPC .......................... 30/276; 56/12.7, 17.1, 17.2
See application file for complete search history.

(56) References Cited

U.S. PATENT DOCUMENTS

| | | | | |
|---|---|---|---|---|
| 5,430,943 A | * | 7/1995 | Lee ..................... | A01D 34/4168 30/276 |
| 6,108,914 A | * | 8/2000 | Sheldon ............. | A01D 34/4166 30/276 |
| 6,944,956 B1 | | 9/2005 | Fogle | |
| 7,111,403 B2 | * | 9/2006 | Moore ............... | A01D 34/4166 30/276 |

(Continued)

FOREIGN PATENT DOCUMENTS

| | | |
|---|---|---|
| CN | 1366803 | 9/2002 |
| EP | 1416786 | 5/2004 |

*Primary Examiner* — Andrea L Wellington
*Assistant Examiner* — Liang Dong
(74) *Attorney, Agent, or Firm* — Gudrun E. Huckett

(57) ABSTRACT

A mowing head for a trimmer is rotated about an axis of rotation when operated and has a housing with a circumferential wall. A fastening device with a trimmer line guide with a trimmer line channel is provided for the trimmer line. The trimmer line channel has a clamping section with a longitudinal direction. The clamping section has a wide longitudinal side and a narrow longitudinal side, both extending in the longitudinal direction. The clamping section has an inner width tapering from the wide longitudinal side toward the narrow longitudinal side. The trimmer line guide has a deflection edge adjoining the clamping section. The deflection edge is slanted relative to the longitudinal direction such that the deflection edge generates a force component acting on the trimmer line directed toward the narrow longitudinal side when a pulling force is acting on the trimmer line guided through the fastening device.

15 Claims, 5 Drawing Sheets

(56) References Cited

U.S. PATENT DOCUMENTS

| | | | |
|---|---|---|---|
| 8,973,274 B2* | 3/2015 | Proulx | A01D 34/4166 30/276 |
| 2002/0095797 A1 | 7/2002 | Warashina et al. | |
| 2007/0006467 A1* | 1/2007 | Angstenberger | A01D 34/4166 30/276 |
| 2014/0033546 A1* | 2/2014 | Arnetoli | A01D 34/4166 30/347 |

* cited by examiner

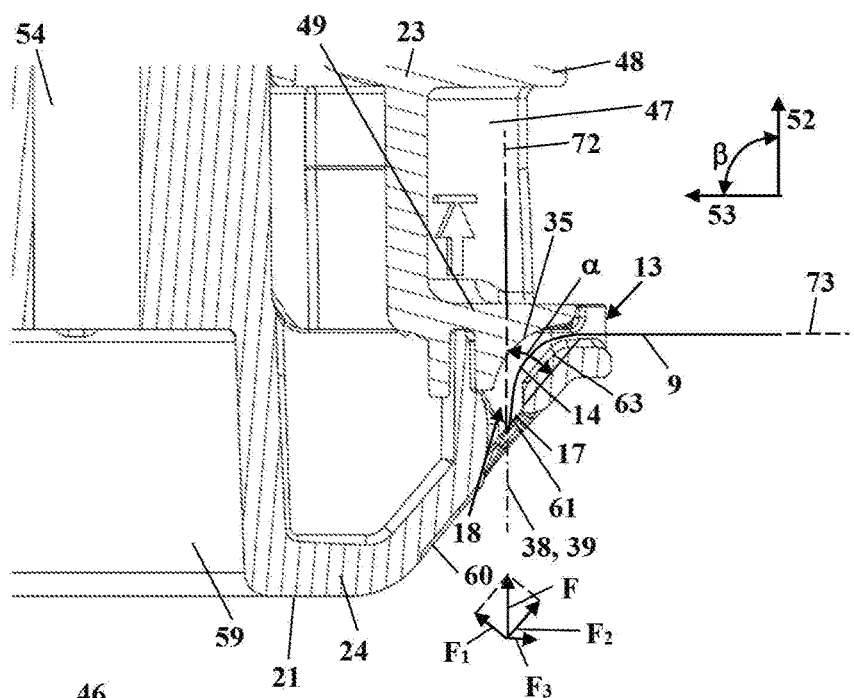
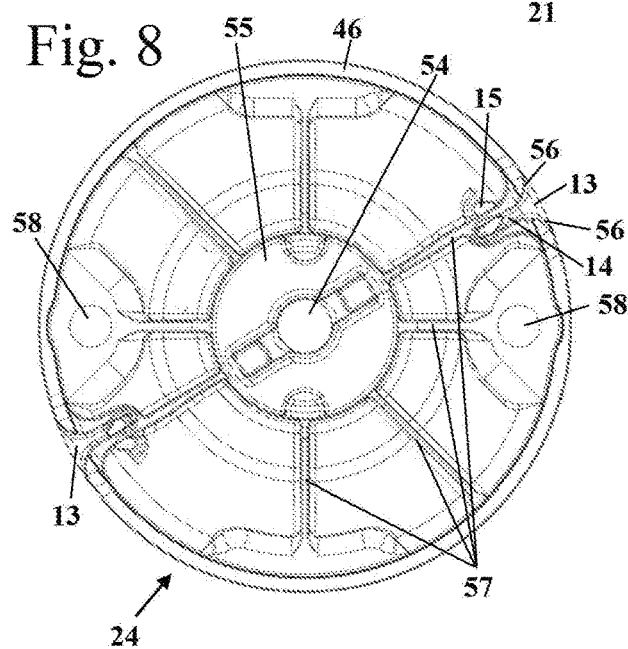
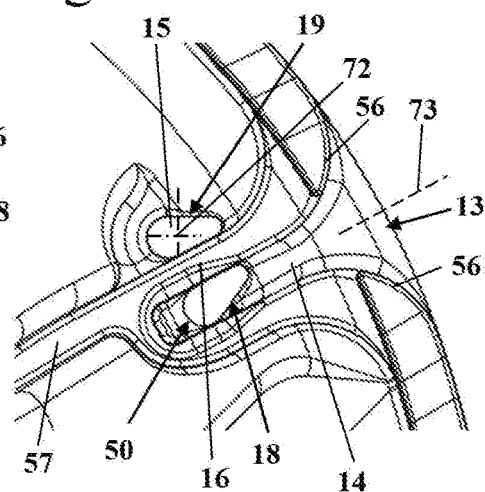
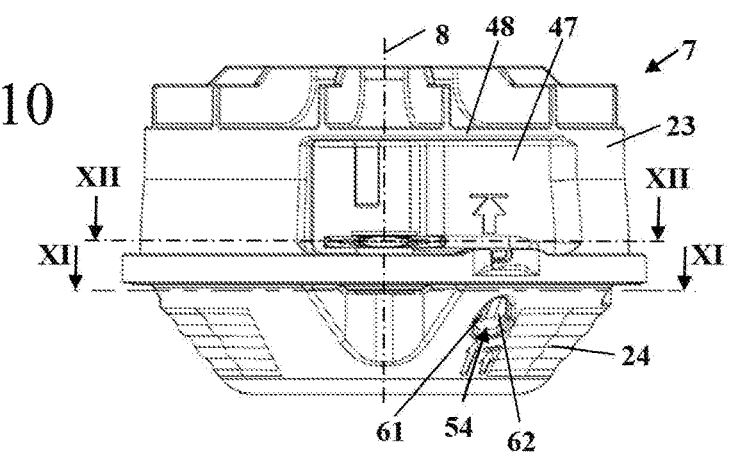

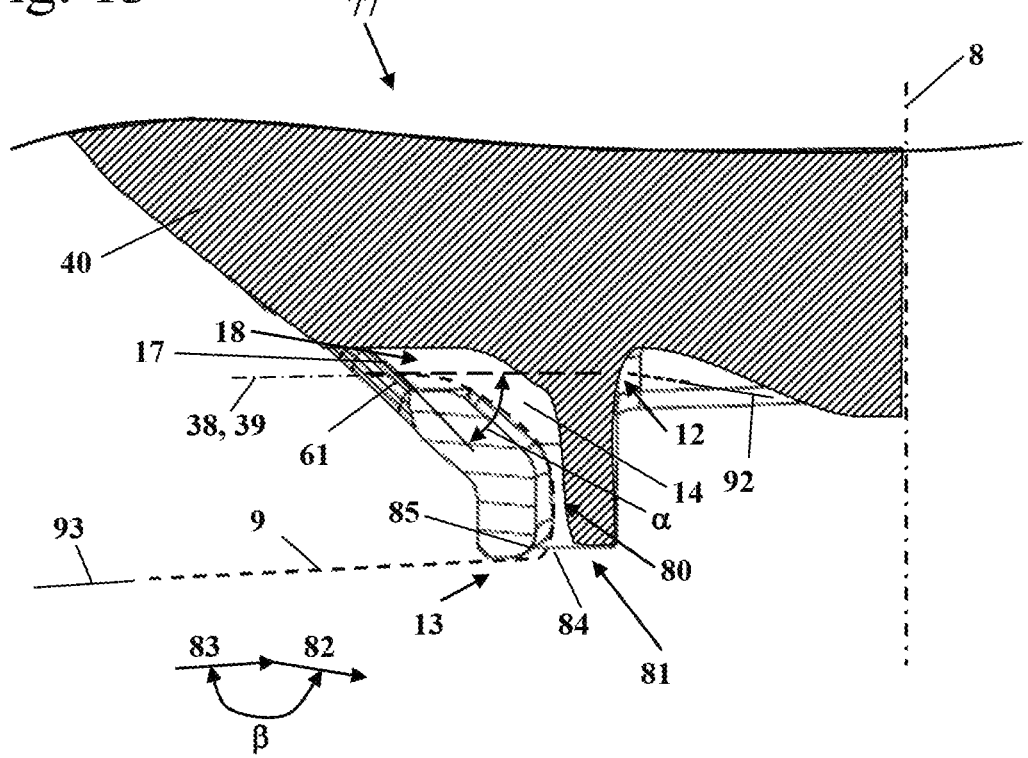

MOWING HEAD FOR A TRIMMER

CROSS-REFERENCE TO RELATED APPLICATIONS

This application is a divisional application of U.S. patent application Ser. No. 15/218,139 having a filing date of 25 Jul. 2016, the United States patent application claiming a priority date of 12 Aug. 2015 based on prior filed German patent application No. 10 2015 010 579.5, the entire contents of the aforesaid United States patent application and the aforesaid German patent application being incorporated herein by reference.

BACKGROUND OF THE INVENTION

The invention relates to a mowing head for a trimmer. The mowing head comprises an axis of rotation about which the mowing head is to be driven in rotation when operated, wherein the mowing head comprises a housing provided with a circumferential wall. The mowing head comprises at least one fastening device for a trimmer line, wherein the fastening device comprises a trimmer line guide comprising at least one trimmer line channel. The trimmer line channel comprises a clamping section and the clamping section comprises a wide longitudinal side and a narrow longitudinal side which extend in a longitudinal direction of the clamping section. An inner width of the clamping section tapers from the wide longitudinal side toward the narrow longitudinal side.

The invention further relates to a mowing head for a trimmer comprising at least one trimmer line. The mowing head comprises an axis of rotation about which the mowing head is to be driven in rotation when operated, wherein the mowing head comprises a housing provided with a circumferential wall. The mowing head comprises at least one fastening device that secures the trimmer line on the mowing head, wherein the fastening device comprises a trimmer line guide comprising at least one trimmer line channel. The trimmer line channel comprises a clamping section and the clamping section comprises a wide longitudinal side and a narrow longitudinal side which extend in a longitudinal direction of the clamping section. An inner width of the clamping section tapers from the wide longitudinal side toward the narrow longitudinal side.

Trimmers or brushcutters for mowing grass or the like are generally known. Such trimmers comprise a mowing head (cutting head) that in operation is driven in rotation and carries a trimmer line that, due to the occurring centrifugal forces in operation, aligns itself approximately radially to the axis of rotation of the mowing head. The trimmer line may be stored on a pre-loaded spool in the mowing head or cutting head; the trimmer line is worn during use and can be refurbished by removal from the spool until the required nominal length of the trimmer line projects again from the mowing head. As an alternative, mowing heads are known in which a trimmer line of predetermined length is secured with its radial inner securing end on the mowing head. When the trimmer line becomes worn, the trimmer line is replaced.

US 2007/0006467 A1 discloses a mowing head for a trimmer in which a U-shaped receiving channel is provided on the mowing head for fastening the securing end of the trimmer line. The receiving channel comprises a clamping section that is arranged in the area between the two legs of the U and that has a tapering wedge shape in cross-section. As the trimmer line is subjected to a pulling action, for example, due to the centrifugal forces acting in operation on the trimmer line, the trimmer line is pulled into the clamping section of the receiving channel and is thereby automatically clamped.

The invention has the object to provide a mowing head for a trimmer as well as a mowing head for a trimmer comprising at least one trimmer line wherein an improved fixation of the trimmer line is achieved.

SUMMARY OF THE INVENTION

In accordance with the present invention, this is achieved for the mowing head for a trimmer in that the trimmer line guide comprises a deflection area adjoining the clamping section and comprising a deflection edge, wherein the deflection edge is slanted relative to the longitudinal direction of the clamping section in such a way that, when a pulling force is acting on the trimmer line guided through the fastening device, the deflection edge generates a force component acting on the trimmer line in the direction of the narrow longitudinal side of the clamping section.

In accordance with the present invention, this is achieved for the mowing head for a trimmer comprising at least one trimmer line in that the trimmer line guide comprises a deflection area adjoining the clamping section and comprising a deflection edge across which the trimmer line is guided, wherein the deflection edge is slanted relative to the longitudinal direction of the clamping section in such a way that, when a pulling force is acting on the trimmer line, the deflection edge generates a force component acting on the trimmer line in the direction toward the narrow longitudinal side of the clamping section.

According to the invention, a fastening device for the trimmer line provided with a trimmer line guide is provided wherein the trimmer line guide comprises a clamping section and a deflection area that is adjoining the clamping section and is provided with a deflection edge. The deflection edge is part of the trimmer line guide so that a trimmer line which is guided through the trimmer line channel is to be guided across the deflection edge. The deflection edge is slanted relative to the longitudinal direction of the clamping section such that, when a pulling force is applied on a trimmer line guided through the fastening device, the deflection edge always generates a force component on the trimmer line in the direction of the narrow longitudinal side of the clamping section. Due to the slanted position of the deflection edge, a force component can always be simply generated on the trimmer line in the direction of the narrow longitudinal side of the clamping section so that the trimmer line is forced or pressed reliably in the direction toward the narrow longitudinal side of the clamping section and thereby is pulled into the clamping wedge. In this way, a self-locking action of the fastening device is achieved. A pulling force acting on the trimmer line causes a clamping force on the trimmer line due to the force component acting in the direction of the narrow longitudinal side of the clamping section. It has been found that by such a slanted positioning of the deflection edge the pull-out force, i.e., the force that is maximally absorbed by the trimmer line before the trimmer line detaches from the fastening device, can be significantly increased. In this context, the pull-out force is increased particularly even when the free end of the trimmer line which is projecting outwardly from the mowing head is not oriented radially relative to the axis of rotation of the mowing head. The deflection edge can be designed in a constructively simple way so that a simple fastening device with very high pull-out force can be realized.

The mowing head is advantageously suitable for trimmer lines with relatively large diameter as well as for trimmer lines with comparatively small diameter. Accordingly, the trimmer line channel must be comparatively wide so that a slanted position of a trimmer line with small diameter is possible in the trimmer line channel. In known mowing heads, the trimmer line can no longer be reliably clamped as a result of a slanted position thereof and, as a result of the pulling forces acting on the trimmer line, can be pulled out of the trimmer line channel. The slant of the deflection edge effects a force component in the direction toward the narrow longitudinal side of the clamping section and thereby a reliable clamping action of the trimmer line in the clamping section and prevents that a trimmer line with a small diameter can be pulled out of the trimmer line guide as a result of pulling forces acting on the trimmer line in case of a slanted position of the trimmer line.

The trimmer line guide encompasses all areas where the trimmer line is guided in the fastening device. The trimmer line guide extends from an entry location where the trimmer line enters the mowing head to an exit location where the trimmer line exits from the mowing head. In this context, the trimmer line guide must not be a closed channel. Preferably, the trimmer line guide is formed at least partially only by walls or edges which are provided only on one longitudinal side of the trimmer line, in particular in the deflection area.

The pulling force is in particular the centrifugal force that is acting on the trimmer line. The pulling force is acting advantageously on the end of the trimmer line which is projecting away from the mowing head. The pulling force is acting in particular in a radial outward direction relative to the axis of rotation of the mowing head.

The longitudinal direction of the clamping section is advantageously positioned at an angle of 10° to 80° relative to the deflection edge in a section plane that is positioned parallel to the axis of rotation and in which the deflection edge is located. The angle is measured in the direction toward the trimmer line channel and opens in the direction toward the narrow longitudinal side of the clamping section. Advantageously, the angle is 20° to 70°, in particular 30° to 60°. The angle is advantageously so large that no self-locking action occurs on the deflection edge upon gliding of the trimmer line across the deflection edge. In a particularly advantageous arrangement, the longitudinal direction of the clamping section extends parallel to the axis of rotation of the mowing head. A pleasing outer appearance, a minimal air resistance, and a compact shape of the mowing head are achieved when the mowing head, in the section which is provided with the trimmer line channel, comprises at least partially a conical outer contour and when the angle at which the deflection edge is positioned relative to the axis of rotation corresponds approximately to the cone angle. The cone angle in this context is the angle between the axis of rotation and the outer wall surface of the cone, i.e., the exterior side of the mowing head in the area of the conical outer contour. In this way, the deflection edge can be arranged with minimal displacement relative to the external wall in the conical section so that the trimmer line, independent of its position at the deflection edge, is approximately flush with the outer contour of the mowing head. For increasing the clamping action, it can however be advantageous that the angle at which the deflection edge is positioned relative to the axis of rotation is greater than the cone angle. Also, a cone angle that is greater than the angle at which the deflection edge is positioned relative to the axis of rotation can be advantageous, for example, in order to achieve a pleasing outer appearance of the mowing head.

Advantageously, the narrow longitudinal side of the clamping section of the at least one trimmer line channel is arranged radially outwardly and the wide longitudinal side is arranged radially inwardly. In this way, the centrifugal force which is acting on the free end of the trimmer line is acting in the direction toward the narrow longitudinal side without a further deflection of the trimmer line being required in order to provide the clamping force.

Advantageously, the mowing head has an end face which delimits the mowing head in the direction of the axis of rotation. In the trimmer line channel, there is advantageously a deflection contour formed that deflects a trimmer line which is secured in the fastening device from the circumferential wall of the mowing head toward the end face or from the end face toward the circumferential wall. In this way, an advantageous arrangement of the fastening device on the mowing head can be achieved.

Advantageously, the trimmer line channel is a first trimmer line channel and the mowing head comprises a second trimmer line channel, wherein the deflection edge is arranged between the two trimmer line channels. In this context, each trimmer line channel comprises a clamping section. Since two trimmer line channels each comprising with a clamping section are provided, an improved fixation of the trimmer line is achieved. By means of the slant of the deflection edge, the trimmer line is forced in both trimmer line channels in the direction toward the narrow longitudinal side. The bending stiffness of the trimmer line is advantageously so great that only at one of the ends of the trimmer line a pulling force must be acting on the trimmer line in order to force the trimmer line in both trimmer line channels in the direction toward the narrow longitudinal side. The pulling force on the trimmer line is in particular applied by the centrifugal force which is acting on the cutting end of the trimmer line.

A compact configuration results when the longitudinal directions of the clamping sections of the trimmer line channels extend approximately parallel to each other and the trimmer line channels each have a sidewall which is facing the other trimmer line channel, respectively, wherein the sidewalls are formed on a common partition web provided with an end face on which the deflection edge is formed. The end face in this context is the side of the partition web that is positioned between the sidewalls delimiting the clamping sections. The end face is positioned advantageously on an exterior side of the mowing head. The trimmer line channels extend in this context advantageously parallel to each other within the limits of the manufacturing precision. In this context, for example, when manufacturing the mowing head as an injection molded plastic part, drafts can be provided so that the sidewalls have a minimal angle relative to each other.

Advantageously, the trimmer line guide begins at an inlet opening which is positioned in an entry direction and ends at an outlet opening which is positioned in an exit direction. In this context, the inlet opening is the opening through which the free cutting end of the trimmer line is projecting. It can also be provided that a cutting end of the trimmer line is exiting at the inlet opening as well as at the outlet opening. Through the inlet opening, the trimmer line can be pushed into the trimmer line guide when mounting the trimmer line on the mowing head. Mounting in opposite direction can however be advantageous; also, mounting such that the trimmer line is pushed into the trimmer line channel from openings that are positioned between inlet opening and outlet opening, i.e., from a central area of the trimmer line channel may be advantageous. Advantageously, a straight entry line which is extending through the inlet opening and is positioned in the entry direction and a straight exit line extending through the outlet opening and positioned in exit direction are skew ("skew lines"). The straight entry line and the straight exit line therefore do not intersect each other but are positioned at a spacing relative to each other. In a plane in which the straight entry line is positioned and which is defined by the directional vector formed by the exit direction, the entry direction is therefore positioned relative to the exit direction at an angle that is greater than 0°. Advantageously, the angle between the directional vectors of entry direction and exit direction is greater than 45°. Particularly preferred, the angle between the entry direction and exit direction is approximately 90°. Advantageously, the trimmer line channel adjoining the outlet opening has no deflection contour while the trimmer line channel adjoining the inlet opening comprises a deflection contour for the trimmer line. Advantageously, in the trimmer line channel adjoining the outlet opening, the trimmer line is not deflected toward the circumferential wall. Therefore, at the inlet opening there is more space available for rounded sections so that the risk of breakage of the trimmer line in the area of the inlet opening is reduced. In this context, the inlet opening is advantageously the opening from which the cutting end of the trimmer line is projecting away. Advantageously, the inlet opening is formed on a first trimmer line channel and the outlet opening is formed on a second trimmer line channel.

Advantageously, the trimmer line channel adjoins the inlet opening. The deflection area adjoins the other end of the trimmer line channel. Particularly preferred, the trimmer line guide comprises the inlet opening, a first trimmer line channel, the deflection area, a second trimmer line channel, and the outlet opening, wherein these parts adjoin each other in the given sequence.

A simple configuration of the mowing head is achieved when the mowing head comprises a housing that is formed of at least two housing parts, wherein the two housing parts delimit the trimmer line guide and are connected to each other by at least one rivet. Due to the fact that both housing parts delimit the trimmer line guide, a simple manufacture of the trimmer line guide is possible, in particular when producing the housing parts by injection molding. Preferably, the at least one rivet provides a blade receptacle where a blade can be suspended. No additional components are required therefore for the blade receptacle. The mowing head can be operated alternatively with at least one blade which is suspended from the blade receptacle or with at least one trimmer line which is secured on the fastening device. Therefore, the mowing head can be variably used.

Advantageously, the mowing head comprises an arc-shaped depression in the circumferential wall adjacent to the rivet wherein the center of the depression is positioned radially between the rivet and the axis of rotation and is arranged so as to be leading relative to a connecting plane that contains the axis of rotation and a longitudinal center axis of the rivet. The spacing of the center of the depression relative to the axis of rotation is thus smaller than the spacing of the center axis of the rivet relative to the axis of rotation. The diameter of the arc-shaped depression corresponds in this context at least to the width of the blade so that the blade can enter the arc-shaped depression. Since the arc-shaped depression in the rotational direction of the mowing head is arranged so as to be leading relative to the connecting plane of axis of rotation and longitudinal center axis of the rivet, a blade can be removed from the rivet only when the blade is positioned in a predetermined angular position and a force is exerted in the direction of the longitudinal blade axis on the blade so that the blade is displaced into the arc-shaped depression. In other angular positions, disengagement of the blade is advantageously prevented by a boundary contour which is formed on the mowing head. In addition to the arc-shaped depression, a recess can be provided following the blade and the blade body can pivot into the recess when the blade body impacts in operation on an obstacle. Accordingly, damage of the blade can be prevented and the impulse acting on the obstacle can be reduced.

For a mowing head for a trimmer comprising at least one trimmer line, it is provided that the trimmer line guide comprises a deflection area adjoining the clamping section and comprising a deflection edge across which the trimmer line is guided. The deflection edge is slanted relative to the longitudinal direction of the clamping section such that, when a pulling force is acting on the trimmer line, the deflection edge generates a force component on the trimmer line in the direction toward the narrow longitudinal side of the clamping section.

BRIEF DESCRIPTION OF THE DRAWING

FIG. 7 is a detail view of a section of the mowing head along the section line VII-VII of FIG. 5.

FIG. 8 is a top view of the lower housing part of the mowing head.

FIG. 9 is a detail view of the area of the trimmer line channels of FIG. 8.

FIG. 10 is a side view of the mowing head.

FIG. 13 is a detail view of a section of a further embodiment of the mowing head.

DESCRIPTION OF THE PREFERRED EMBODIMENTS

Figure 1:
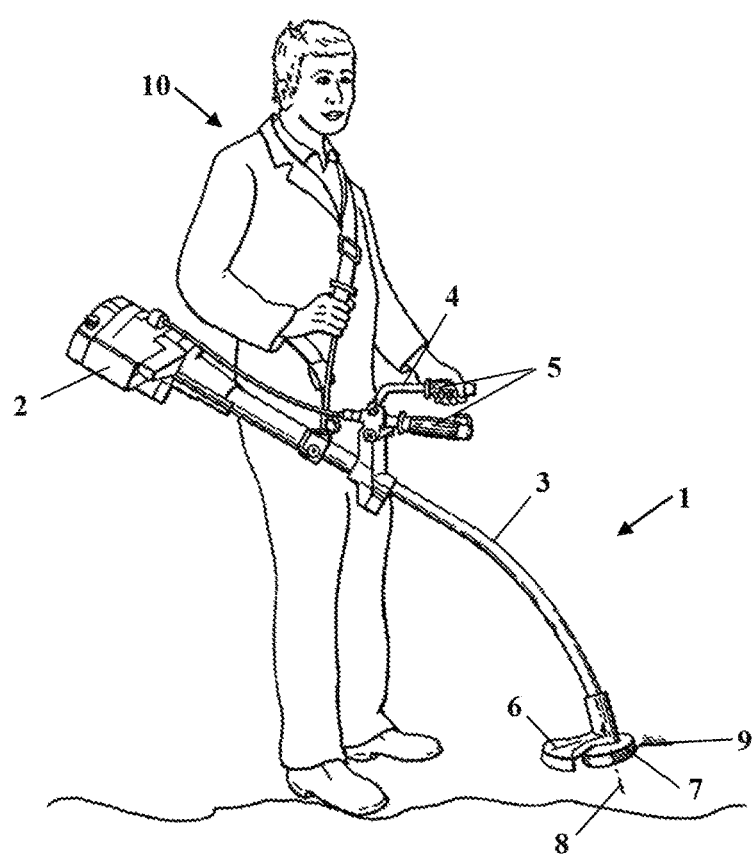
FIG. 1 is a schematic illustration of an operator with the trimmer.

FIG. 1 shows schematically a trimmer 1 carried by an operator 10. The trimmer 1 comprises a housing 2 that is connected by a guide tube 3 with the mowing head 7. The mowing head 7 is rotatably supported relative to the guide tube 3. The mowing head 7 is partially covered by guard 6 in the embodiment. The mowing head 7 rotates in operation about an axis of rotation 8. In FIG. 1, the trimmer line 9 that is projecting from the mowing head 7 is schematically indicated by a dashed line. On the guide tube 3, a handle bar 4 is secured on which two handles 5 are arranged for guiding the trimmer 1 in operation.

In housing 2, a drive motor, for example, an internal combustion engine, can be arranged that is driving in rotation the mowing head 7 by means of a shaft rotatably supported in guide tube 3. However, it can also be provided that in the housing 2 an energy store, for example, batteries or rechargeable batteries, are arranged which are connected by means of connecting cables guided within the guide tube 3 to an electric motor which is secured adjacent to the mowing head 7 on the guide tube 3. When the trimmer 1 is supplied by an electric cable with energy, the housing 2 can also be omitted.

Figure 2:
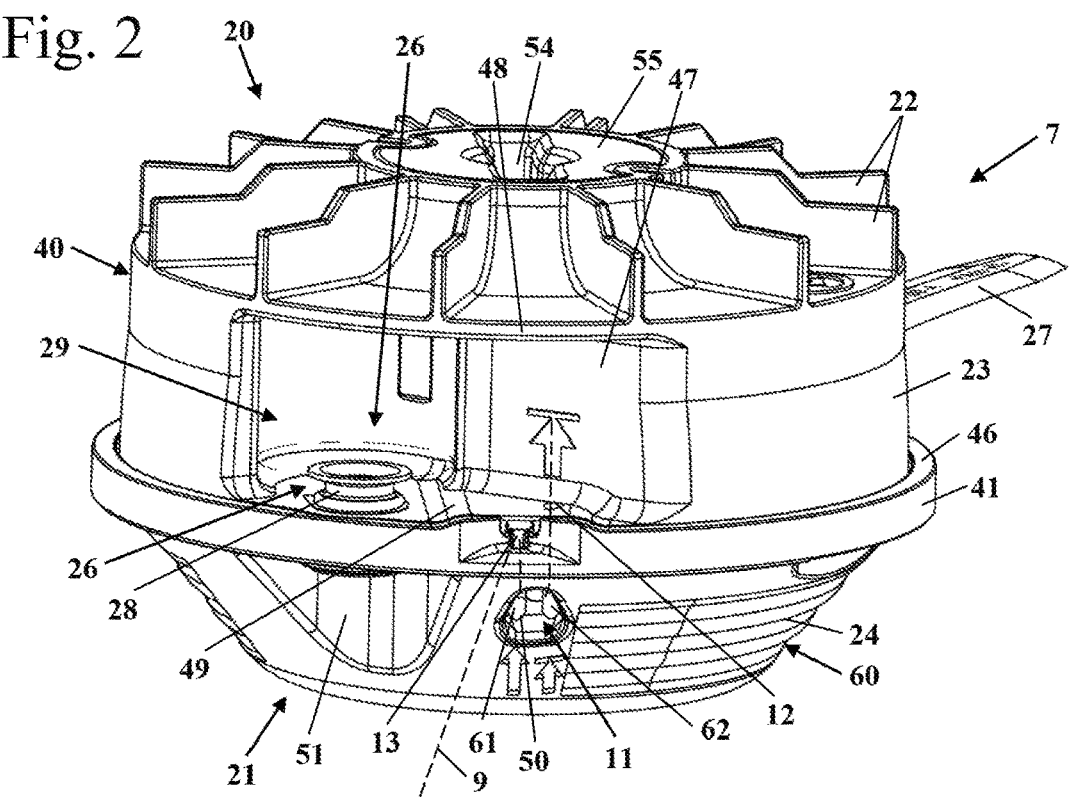
FIG. 2 is a perspective illustration of the mowing head of the trimmer of FIG. 1.

As shown in FIG. 2, the mowing head 7 comprises a housing 40 which in the embodiment comprises a first housing part 23 and a second housing part 24. In the embodiment, the housing parts 23 and 24 are designed as half shells. The housing 40 comprises a top side 20 which in operation is facing away from the ground and, in the embodiment, is formed on the first housing part 23 and a bottom side 21 which in operation is facing the ground and is formed on the second housing part 24 in the embodiment. A different configuration of the housing 40, for example, a one-part configuration can also be advantageous, however. On the top side 20, a plurality of fan vanes 22 are arranged. The fan vanes 22 serve advantageously for generating a cooling air flow. This is in particular advantageous when the mowing head 7 is arranged adjacent to an electric motor. The housing 40 comprises a circumferential wall 41 which is partially formed by the top housing part 23 and partially formed by the bottom housing part 24 and which delimits the housing 40 in radial direction relative to the axis of rotation 8 (FIG. 1). As also shown in FIG. 2, the second housing part 24 comprises a rim 46 which also forms a section of the circumferential wall 41 and engages across the first housing part 23. In the first top housing part 23, the circumferential wall 41 comprises a recess 47 where the circumferential wall 41 is displaced in the direction toward the axis of rotation 8, i.e., inwardly. The recess 47 comprises an arc-shaped depression 29 and a rivet 28 is arranged in the area of the depression 29. The rivet 28 connects the two housing parts 23 and 24 fixedly with each other and forms at the same time a blade receptacle 26. As shown in FIG. 2, in the area of the rivet 28, the second housing part 24 comprises a depression 51 in which the rivet 28 is arranged.

The mowing head 7 comprises two blade receptacles 26. In FIG. 2, a blade 27 is arranged in the blade receptacle 26 that is not visible in the illustration of FIG. 2. Alternatively, pre-cut pieces of trimmer line 9 can be secured on the mowing head 7. For this purpose, the mowing head 7 comprises at least one fastening device 11. In the embodiment, two oppositely positioned fastening devices 11 are provided of which one is shown in FIG. 2. Also, a different number of fastening devices 11 can be advantageous however.

In FIG. 2, a trimmer line 9 is indicated schematically in dashed lines in the fastening device 11. The trimmer line 9 enters the fastening device 11 via inlet opening 13. The inlet opening 13 is part of a trimmer line guide 50 through which the trimmer line 9 is guided until it exits the fastening device 11 via outlet opening 12. The trimmer line 9 is secured in an area between its ends in the fastening device 11. The inlet opening 13 is in this context the opening from where the cutting end of the trimmer line is projecting. In the embodiment, the cutting end of the trimmer line is exiting through the inlet opening 13 and the trimmer line end exiting from the outlet opening 12 ends at the mowing head 7. However, it can also be provided that cutting ends of the trimmer line are exiting through the outlet opening 12 as well as through the inlet opening 13. The trimmer line 9 to be secured on the mowing head 7 is advantageously inserted through the inlet opening 13 into the trimmer line guide 50. A different mounting action of the trimmer line 9 can however be advantageous also, for example, a mounting action that begins at the outlet opening 12. In the embodiment, the inlet opening 13 is formed on the circumferential wall 41. The outlet opening 12 is formed on a wall 49 that delimits the recess 47 in the direction toward the second housing part 24. The recess 47 is delimited by a wall 48 at the side facing away from the second housing part 24; on top of the wall 48, the fan vanes 22 are provided. An arrangement of the outlet opening 12 at another location of the housing 40, for example, on the top side 20, can also be advantageous.

As shown in FIG. 2, the trimmer line 9 is deflected in the trimmer line guide 50 from the inlet opening 13 first in the direction toward the bottom side 21 and exits at the conical section 60 of the circumferential wall 41, formed on the second housing part 24, through opening 61 from the housing 40 and enters the housing 40 again through opening 62 that is arranged adjacent to the opening 61. When mounting the trimmer line 9 on the mowing head 7, the operator 10 can pull the trimmer line 9 through opening 61 until the desired length of the cutting section of the trimmer line 9 has been reached and subsequently can guide the other trimmer line end through the opening 62. The trimmer line 9 is guided from opening 62 in the direction toward the top side 20 until it exits through the outlet opening 12. A mounting action that begins at the opening 61 and 62 or begins at the outlet opening 12 can be advantageous also. In the embodiment, the trimmer line guide 50 extends from the opening 62 to the outlet opening 12 in a straight line. As also shown in FIG. 2, the housing part 24 comprises a socket 55 on which a fastening opening 54 for fixation of the mowing head 7 on a drive shaft is formed. The socket 55 is formed on the second bottom housing part 24 and projects through the first upper housing part 23.

Figure 3:
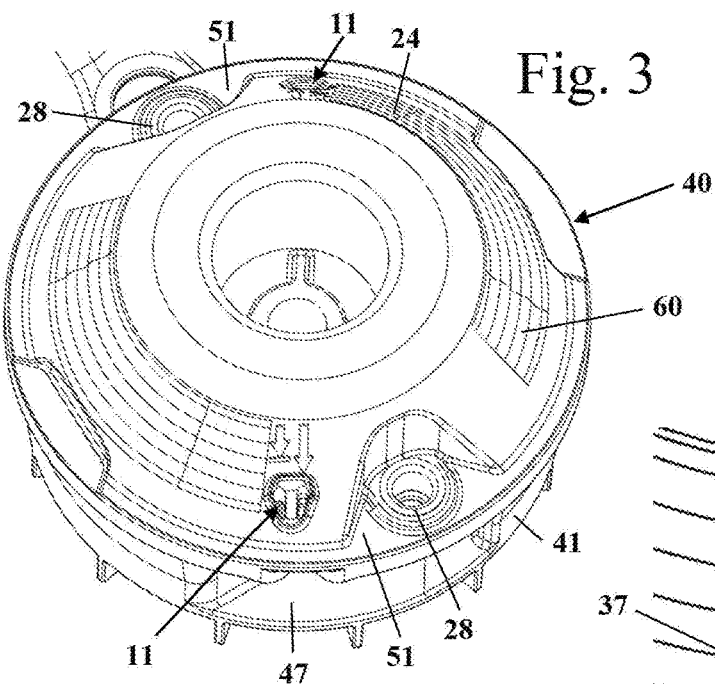
FIG. 3 is another perspective illustration of the mowing head of the trimmer of FIG. 1.

FIG. 3 shows in a perspective illustration the housing 40 with the two oppositely arranged fastening devices 11 and the two oppositely arranged rivets 28 for the blade receptacles 26. As shown in FIG. 3, one fastening device 11 and one rivet 28 are positioned adjacent to each other in circumferential direction and are arranged in a common recess 47 of the circumferential wall 41.

Figure 4:
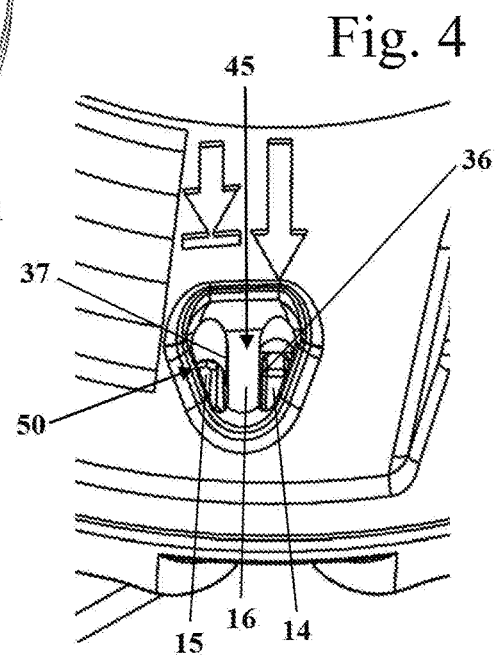
FIG. 4 is a detail view of the area of the fastening device of FIG. 3.

As shown in FIG. 4, the trimmer line guide 50 comprises a first trimmer line channel 14 and a second trimmer line channel 15 between which a partition web 16 is formed. In the embodiment, the first and second trimmer line channels 14 and 15 extend approximately parallel to each other. Between the first and second trimmer line channels 14 and 15, a deflection area 45 of the trimmer line guide 50 is arranged which adjoins the trimmer line channel 14 and the trimmer line channel 15, respectively. On the partition web 16, a sidewall 36 of the first trimmer line channel 14 and a sidewall 37 of the second trimmer line channel 15 are formed. The sidewalls 36 and 37 extend approximately parallel to each other.

Figure 5:
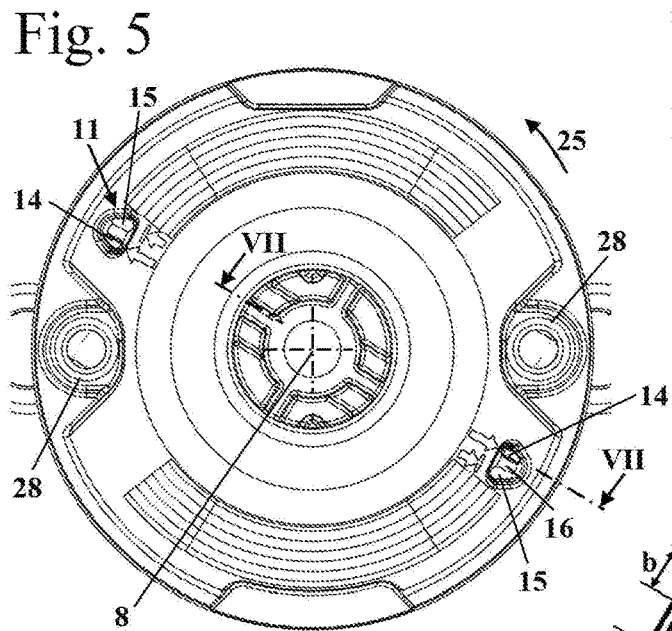
FIG. 5 is bottom view of the mowing head.

In FIG. 5, the rotational direction 25 of the mowing head 7 in operation is indicated. As shown in FIG. 5, a rivet 28 is arranged so as to be leading relative to a fastening device 11 for a trimmer line 9 in regard to the rotational direction 25.

Figure 6:
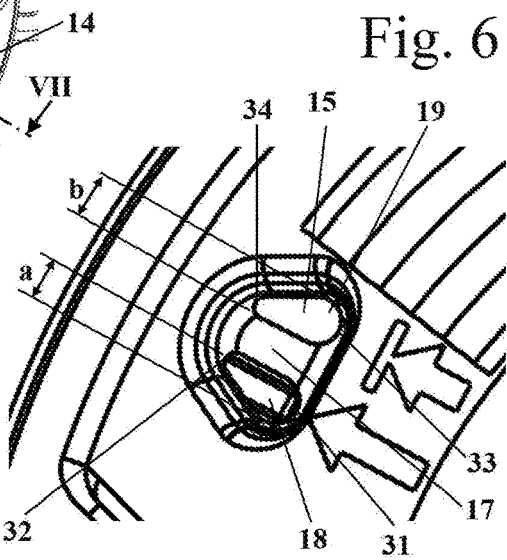
FIG. 6 is a detail view of the area of the fastening device of FIG. 5.

FIG. 6 shows the configuration of the trimmer line channels 14 and 15 in detail. For ease of illustration, the first trimmer line channel 14 is shown only in FIG. 5. The first trimmer line channel 14 comprises a first clamping section 18 that has a wedge-shaped configuration in cross-section. The second trimmer line channel 15 comprises a second clamping section 19 that also has a wedge-shaped configuration. The end face of the partition web 16, i.e., the surface (see FIG. 4) forming the outer side of the mowing head 7 and arranged between the sidewalls 36 and 37, forms a deflection edge 17 for the trimmer line 9.

The first clamping section 18 comprises a narrow longitudinal side 32, which is arranged in the embodiment radially outwardly, as well as a wide longitudinal side 31 which is arranged in the embodiment relative to the axis of rotation 8 radially inwardly. The second clamping section 19 also comprises a wide longitudinal side 33, which is radially inwardly arranged, as well as a narrow longitudinal side 34, which is arranged radially outwardly. The first clamping section 18 comprises an inner width a which is greater than a maximum diameter of a trimmer line 9 to be arranged on the mowing head 7. The second clamping section 19 comprises an inner width b. The inner width a and the inner width b each are measured in circumferential direction relative to the axis of rotation 8 and perpendicular to the sidewalls 36 and 37 (FIG. 4).

As shown in FIG. 6, the inner width in the first and second clamping sections 18 and 19 continuously decreases from the wide longitudinal sides 31, 33 to the narrow longitudinal sides 32, 34 so that the wedge shape of the first and second clamping sections 18 and 19 results. On the narrow longitudinal sides 32, 34, the inner width of the first and second clamping sections 18, 19 is smaller than the minimum diameter of a trimmer line 9 to be secured in the fastening device 11 so that the trimmer line 9 can be clamped reliably. On the longitudinal sides 31, 32, 33, 34, the first and second clamping sections 18, 19 are of the rounded design in the embodiment.

FIG. 7 shows the configuration of the trimmer line guide 50 in detail. Through the inlet opening 13 the trimmer line 9, shown schematically in FIG. 7, enters the first trimmer line channel 14 in the entry direction 53. The first trimmer line channel 14 is formed between the housing parts 23 and 24 and is delimited by both housing parts 23, 24. In the embodiment, a deflection contour 35 is formed on the first housing part 23 and deflects the trimmer line 9, upon insertion of the trimmer line 9 into the inlet opening 13, relative to the entry direction 53 in the direction toward the bottom side 21 of the mowing head 7. In the embodiment, the trimmer line 9 is deflected from a substantially radial orientation relative to the axis of rotation 8 (FIG. 5) provided at the inlet opening 13 to an orientation aligned in the direction toward the bottom side 21 of the mowing head 7, in the embodiment an axial orientation, i.e., an orientation parallel to the axis of rotation 8 at the opening 61.

Opposite the deflection contour 35, a deflection contour 63 is formed on the housing part 24 in the trimmer line channel 14; this deflection contour 63 absorbs partially the pulling force acting on the trimmer line 9 and deflects the trimmer line 9 in the direction toward the bottom side 21 of the mowing head 7, in the embodiment to a point of alignment parallel to the axis of rotation 8.

At the conical section 60 of the circumferential wall 41, the trimmer line 9 exits from the second housing parts 24 at opening 61. The opening 61 is also shown in FIG. 10. The trimmer line 9 is subsequently guided through the deflection area 45 (FIG. 4) and enters via opening 62, shown in FIG. 10, the second trimmer line channel 15 (FIG. 6). At the outlet opening 12 (FIG. 2), the trimmer line 9 exits from the trimmer line channel 15 in exit direction 52. In the embodiment, the trimmer line 9 is guided in the second trimmer line channel 15 across the entire length of the second trimmer line channel 15 parallel to the axis of rotation 8, as indicated in FIG. 7 by a dashed line.

The mowing head 7 comprises a straight entry line 73 which is positioned in entry direction 53 and which extends through the inlet opening 13. A trimmer line 9 that is guided through the inlet opening 13 extends advantageously at least in the area of the inlet opening 13 congruently to the straight entry line 73. The mowing head 7 comprises a straight exit line 72 extending through the outlet opening 12 and positioned in exit direction 52. A trimmer line 9 that is guided through the outlet opening 12 extends advantageously at least in the area of the outlet opening 12 congruently to the straight exit line 72. The entry direction 53 and the exit direction 52 are in this context directional vectors. The straight exit line 72 and the straight entry line 73 are skew relative to each other, i.e., have a spacing to each other and do not intersect each other. This is the result of the spacing of the trimmer line channels 14 and 15 relative to each other in circumferential direction.

The entry direction 53 at which the trimmer line 9 enters the inlet opening 13 and the exit direction 52 at which the trimmer line 9 exits from the outlet opening 12 are positioned in the embodiment at an angle $\beta$ to each other that is approximately 90°. The angle $\beta$ in this context is illustrated in FIG. 7 in a plane which contains the inlet opening 13 and which is defined by the directional vectors of entry direction 53 and exit direction 52. The angle $\beta$ is advantageously greater than 0°, in particular greater than 45°. Since the trimmer line 9 is exiting into the recess 47, there is more space available adjacent to the inlet opening 13. Accordingly, the outlet opening 13 can be designed with comparatively great rounded portions 56 as shown in FIGS. 8 and 9. Therefore, the risk of trimmer line breakage of a cutting end of a trimmer line at the outlet opening 13 is reduced.

In the conical section 60, the outer wall of the housing 40 is slanted by a cone angle relative to the axis of a cone, wherein this axis of a cone is in particular corresponding to the axis of rotation 8 (FIG. 5). This cone angle advantageously corresponds to an angle $\alpha$ at which the deflection edge 17 is positioned relative to the longitudinal directions 38, 39. The deflection edge 17 and the outer contour of the conical section 60 extend therefore parallel to each other. The deflection edge 17 is displaced relative to the outer contour into the housing 40. The displacement is advantageously at least approximately as large as the diameter of a trimmer line 9 to be secured on the fastening device 11. In this way, the trimmer line 9—independent of its position at the deflection edge 17—is not projecting past the outer contour of the housing 40 so that the air resistance and the soiling tendency at the fastening device 11 can be reduced.

FIG. 7 shows the longitudinal directions 38 and 39 of the clamping sections 18 and 19. The longitudinal directions 38 and 39 define the direction in which the trimmer line 9 is passing through the clamping sections 18 and 19. In the embodiment, the clamping section 18 extends in this context only within the section of the trimmer line channel 14 adjoining the opening 61. The deflection edge 17 extends slantedly relative to the longitudinal directions 38 and 39 at a slant angle $\alpha$ which is measured in the direction of the trimmer line channel 14 and which opens in the direction toward the narrow longitudinal side 32 (FIG. 6) of the first clamping section 18. A pulling force at the free end of the trimmer line 9 that is projecting out of the mowing head 7 effects a force F by deflection of the trimmer line 9 at the deflection edge 17. This force F is acting on the partition web 16 (FIG. 4). The pulling force at the free end of the trimmer line 9 is advantageously the centrifugal force acting in operation of the mowing head 7. The pulling force at the free end of the trimmer line 9 acts advantageously relative to the axis of rotation 8 in radial direction, i.e., perpendicular to the axis of rotation 8 in outward direction. The pulling force acts in this context advantageously in longitudinal direction of the free end of the trimmer line 9.

As a result of the slanted position of the deflection edge 17 relative to the longitudinal direction 38, the force F is divided into a normal force $F_1$ that is acting perpendicular to the deflection edge 17 as well as an output force $F_2$ that is acting tangentially to the deflection edge 17, in particular in the direction toward the narrow longitudinal side 32 (FIG. 6). This means that the output force $F_2$ has a force component $F_3$ which is acting in the direction of the narrow longitudinal side 32 of the first clamping section 18, in the embodiment approximately in radial direction outwardly. Therefore, when a pulling force is acting on the trimmer line 9, the trimmer line 9 glides in the direction toward the narrow longitudinal side 32 of the first clamping section 18 and is pulled in the direction toward the narrow longitudinal side 32 of the first clamping section 18 so that, in addition to the friction force which is acting at the deflection edge 17, a clamping force is generated in the clamping wedge formed by the first clamping section 18; additionally, the normal force $F_1$ is increased so that the pull-out force is increased. The same applies also to the second clamping section 19 in which, as a result of the slanted position of the deflection edge 17 and the bending stiffness of the trimmer line 9, also a force component $F_3$ is acting in the direction toward the narrow longitudinal side 34 (FIG. 6).

The angle α amounts advantageously to 10° to 80°, in particular to 20° to 70°, and particularly preferred to 30° to 60°.

It is particularly preferred that the narrow longitudinal side 32 is arranged in the direction toward the outwardly projecting free end of the trimmer line 9. In the area of the deflection contour 63 advantageously a continuous contact of the trimmer line 9 on the channel wall during operation is provided in order to increase, by means of the friction forces acting thereat, the pull-out force of the trimmer line 9 from the fastening device 11.

As shown in FIG. 7, an access opening 59 with enlarged diameter is provided adjacent to the fastening opening 54 at the bottom side 21. Through the fastening opening 54 advantageously a drive shaft is projecting on which the mowing head 7 is secured fixedly so as to rotate with the drive shaft. For fixation a fastening means, for example, a nut, can be used that can be positioned through the access opening 59 on the drive shaft and can be secured on the drive shaft.

FIGS. 8 and 9 show a view of the inner side of the second housing part 24 which is facing the first housing part 23. As shown in FIG. 8, a plurality of reinforcement ribs 57 extend away from the socket 55 approximately radially in outward direction. The trimmer line channels 14 and 15 are arranged on both sides of a reinforcement rib 57 which extends up to the rim 46. As also shown in FIG. 8, the housing part 24 has openings 58 which serve for receiving the rivet 28.

Figure 11:
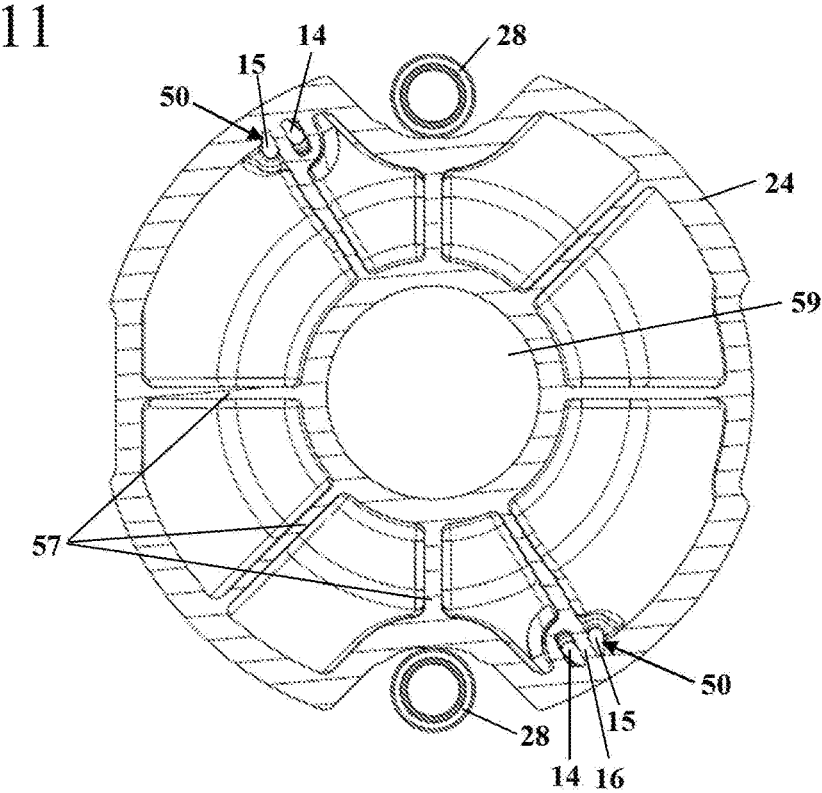
FIG. 11 is a section along the section line XI-XI of FIG. 10.

In the detail illustration of FIG. 9, the rounded portions 56 are shown in detail. Also, it can be seen that the partition web 16 is formed by a reinforcement rib 57. The section illustration of FIG. 7 does not show a section through the axis of rotation 8 but a section slightly displaced thereto. In the area of the partition web 16, the reinforcement rib 57 is thus not exactly radially oriented relative to the axis of rotation 8 but slightly slanted relative to the radial direction. This is also shown in FIG. 11.

Figure 12:
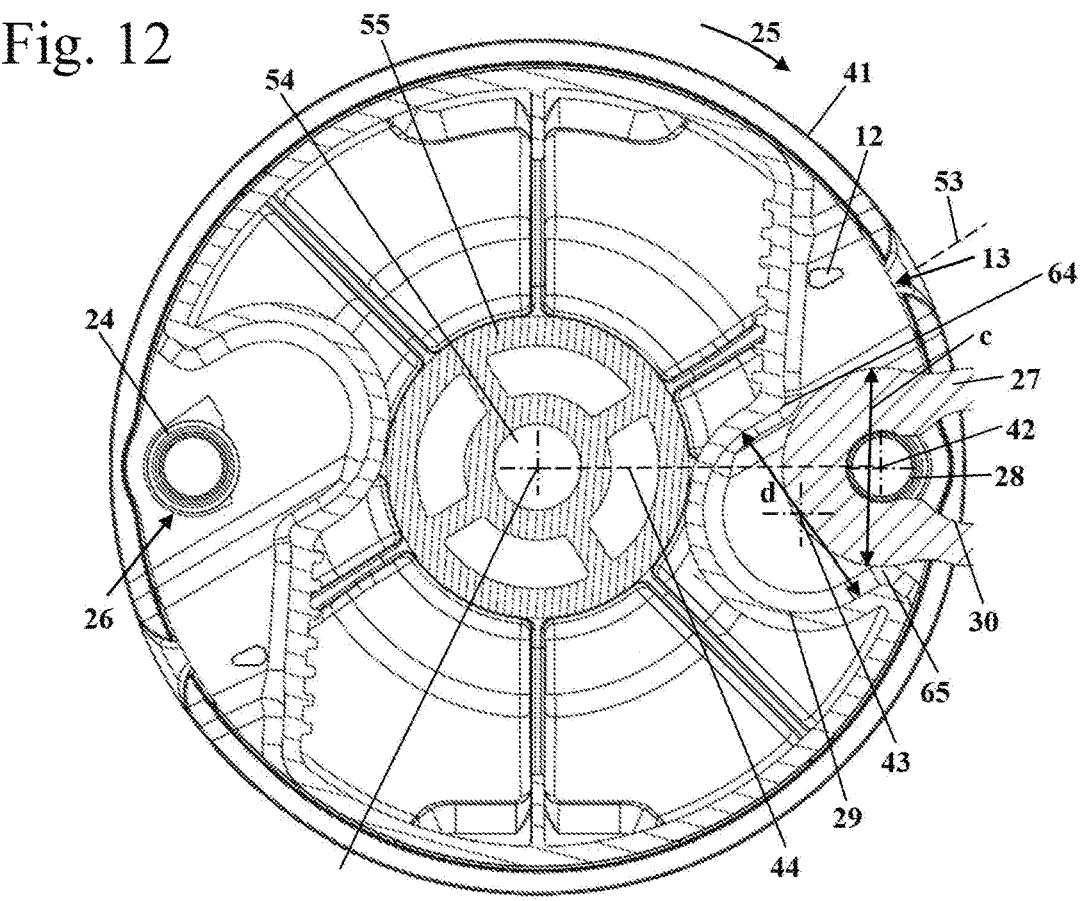
FIG. 12 is a section along the section line XII-XII of FIG. 10.

FIG. 12 shows the configuration of the arc-shaped depression 29 in detail. The arc-shaped depression 29 comprises a circular arc-shape cross-section with center 43 that forms the center axis of the circular arc. The arc-shaped depression 29 comprises a diameter d which is somewhat greater than a width c of a blade 27 which is suspended from the rivet 28 adjacent to the arc-shaped depression 29.

As also shown in FIG. 12, the blade 27 has a receptacle 30 which is advantageously provided with a keyhole-shaped configuration so that the blade 27 by means of the receptacle 30 can be placed onto the rivet 28 in the direction of longitudinal axis 42 of the rivet 28; by displacement of the blade 27, preferably relative to the longitudinal axis 42 of the rivet 28 in a radial outward direction, the blade 27 can be secured on the rivet 28. Relative to the axis of rotation 25, the center 43 is leading relative to a connecting plane 44 that connects the axis of rotation 8 with the longitudinal axis 42 of the rivet 28. In order to remove the blade 27 from the rivet 28, the blade 27 must be pivoted from the radial orientation illustrated in FIG. 12 opposite to the rotational direction 25 until the center 43 of the arc-shaped depression 29 is positioned on an extension of the longitudinal direction of the blade 27. The blade 27 must then be moved approximately radially inwardly until the rivet 28 is positioned in the receptacle 30 of the blade 27 in order to then remove the blade 27 from the rivet 28 in the direction of the longitudinal axis 42 of the rivet 28.

The arc-shaped depression 29 ends at boundary contours 64, 65. The boundary contours 64, 65 prevent a movement of the blade 27 in the direction of the longitudinal direction of the blade 27 as long as the longitudinal direction of the blade 27 is not aligned in the direction toward the center 43 of the arc-shaped depression 29.

It can be advantageous to provide a further depression into which the blade 27, when an impact occurs on the blade 27, can move or escape in order to avoid damage of the blade 27 in operation.

In the embodiment according to FIGS. 1 to 12, the longitudinal directions 38, 39 of the clamping sections 18, 19 extend parallel to the axis of rotation 8. A different orientation of the longitudinal directions 38, 39, for example, perpendicular to the axis of rotation 8 in radial direction of the axis of rotation 8 can also be advantageous, however.

FIG. 13 shows an embodiment of a mowing head 77 that comprises a fastening device 81. The fastening device 81 comprises a trimmer line guide 80 which extends from an inlet opening 13, which opens into the trimmer line guide 80, to the outlet opening 12 from the trimmer line guide 80. The configuration of the fastening device 81 corresponds to that of the fastening device 11. In all Figures, same reference characters identify elements that are the same or functionally the same.

In comparison to the fastening device 11, the fastening device 81 is arranged rotated by 90° on the mowing head 77. In the fastening device 81, the longitudinal directions 38 and 39 of the clamping sections 18 and 19 extend in radial direction relative to the axis of rotation 8. The first trimmer line channel 14 extends from the opening 61 at the deflection edge 17 to an opening 84 at the bottom side 21 of the mowing head 77. The trimmer line 9, indicated in dashed lines in FIG. 13, exits in downward direction from the first trimmer line channel 14 via the opening 84. On a radially outwardly positioned side of the opening 84, the housing 40 is provided with a deflection contour 85 which also forms part of the trimmer line guide 80. The trimmer line 9 is deflected at the deflection contour 85 into an orientation that is approximately radial to the axis of rotation 8 and oriented outwardly. The trimmer line 9 enters the trimmer line guide 80 via the inlet opening 13 in an entry direction 83 and exits via the outlet opening 12 in exit direction 13 from the trimmer line guide 80. The entry direction 83 and the exit direction 82 are directional vectors that are positioned at an angle β that is greater than 0° relative to each other. In the embodiment, the angle β is significantly greater than 90°. The angle β is only slightly smaller than 180°. A parallel orientation of entry direction 83 and exit direction 82 can also be advantageous, however. The mowing head 77 comprises a straight entry line 93 which extends in entry direction 83 through the downwardly open inlet opening 13 and a straight exit line 92 which extends in exit direction 82 through the outlet opening 12. The straight entry line 93 and the straight exit line 92 are displaced relative to each other in circumferential direction and therefore are skew.

The illustrated configuration of the fastening devices can also be advantageous for mowing heads of different construction, in particular for mowing heads with a different configuration of the housing 40, for example, a one-piece configuration, and/or without blade receptacles 26 and/or without recesses 47.

While specific embodiments of the invention have been shown and described in detail to illustrate the inventive principles, it will be understood that the invention may be embodied otherwise without departing from such principles.

What is claimed is:

1. A mowing head for a trimmer, the mowing head comprising:
   an axis of rotation about which the mowing head is driven in rotation when operated;
   a housing comprising a circumferential wall;
   at least one fastening device configured to secure a trimmer line on the mowing head, wherein the at least one fastening device comprises a trimmer line guide;
   the trimmer line guide comprising a first trimmer line channel and the first trimmer line channel comprising a first clamping section;
   the first clamping section having a first longitudinal direction and comprising a wide longitudinal side extending in the first longitudinal direction and a narrow longitudinal side extending in the first longitudinal direction, wherein the wide longitudinal side and the narrow longitudinal side extend at least partially across a same length section of the first clamping section;
   the first clamping section comprising an inner width tapering in a direction from the wide longitudinal side toward the narrow longitudinal side;
   the trimmer line guide comprising a deflection area adjoining the first clamping section;
   the deflection area comprising a deflection edge that is slanted relative to the first longitudinal direction of the first clamping section such that the deflection edge generates a force component acting on the trimmer line in a direction toward the narrow longitudinal side of the first clamping section when a pulling force is acting on the trimmer line guided through the at least one fastening device;
   the trimmer line guide further comprising a second trimmer line channel and a partition web disposed between the first trimmer line channel and the second trimmer line channel;
   the partition web comprising an end face, wherein the end face comprises a surface forming an outer side of the mowing head and wherein the surface forms the deflection edge for the trimmer line.

2. The mowing head according to claim 1, wherein the first trimmer line channel has a first sidewall formed on the partition web and the second trimmer line channel has a second sidewall formed on the partition web opposite the first sidewall.

3. The mowing head according to claim 2, wherein the first and second sidewalls are approximately parallel to each other.

4. The mowing head according to claim 1, wherein the second trimmer line channel comprises a second clamping section having a second longitudinal direction, wherein the first and second longitudinal directions extend approximately parallel to each other.

5. The mowing head according to claim 1, wherein the mowing head comprises a conical section, provided with the first and second trimmer line channels and comprising at least partially a conical outer contour, wherein the deflection edge and the conical outer contour of the conical section extend parallel to each other.

6. The mowing head according to claim 1, wherein the deflection edge is displaced into the housing relative to an outer contour of the housing.

7. The mowing head according to claim 1, wherein the first longitudinal direction of the first clamping section is positioned relative to the deflection edge at an angle of 10° to 80° in a section plane that is parallel to the axis of rotation and that contains the deflection edge, wherein the angle is oriented in a direction toward the first trimmer line channel and opens in a direction toward the narrow longitudinal side of the first clamping section.

8. The mowing head according to claim 1, wherein, viewed in a radial direction relative to the axis of rotation, the narrow longitudinal side of the first clamping section of the first trimmer line channel is arranged radially outwardly and the wide longitudinal side is arranged radially inwardly.

9. The mowing head according to claim 1, wherein the mowing head further comprises an end face delimiting the mowing head in a direction of the axis of rotation, wherein the first trimmer line channel comprises a deflection contour that deflects the trimmer line guided through the at least one fastening device from the circumferential wall toward the end face.

10. The mowing head according to claim 1, wherein the trimmer line guide begins at an inlet opening that is positioned in an entry direction and wherein the trimmer line guide ends at an outlet opening that is positioned in an exit direction.

11. The mowing head according to claim 10, wherein the trimmer line guide has a straight entry line extending through the inlet opening and positioned in the entry direction and further has a straight exit line extending through the outlet opening and positioned in the exit direction, wherein the straight entry line and the straight exit line are skew relative to each other.

12. The mowing head according to claim 1, wherein the housing comprises at least two housing parts, wherein the at least two housing parts delimit the trimmer line guide and are connected to each other by at least one rivet.

13. A mowing head for a trimmer, the mowing head comprising:
   an axis of rotation about which the mowing head is driven in rotation when operated;
   a housing comprising a circumferential wall;
   at least one trimmer line;
   at least one fastening device comprising a trimmer line guide and securing the at least one trimmer line on the mowing head;
   the trimmer line guide comprising a first trimmer line channel;
   the first trimmer line channel comprising a clamping section;

the clamping section having a longitudinal direction and comprising a wide longitudinal side extending in the longitudinal direction and a narrow longitudinal side extending in the longitudinal direction, wherein the wide longitudinal side and the narrow longitudinal side extend at least partially across a same length section of the clamping section;

the clamping section comprising an inner width tapering in a direction from the wide longitudinal side toward the narrow longitudinal side;

the trimmer line guide comprising a deflection area adjoining the clamping section;

the deflection area comprising a deflection edge and the at least one trimmer line is guided across the deflection edge;

the deflection edge being slanted relative to the longitudinal direction of the clamping section such that the deflection edge generates a force component acting on the at least one trimmer line in a direction toward the narrow longitudinal side of the clamping section when a pulling force is acting on the at least one trimmer line;

the trimmer line guide further comprising a second trimmer line channel and a partition web disposed between the first trimmer line channel and the second trimmer line channel;

the partition web comprising an end face, wherein the end face comprises a surface forming an outer side of the mowing head and wherein the surface forms the deflection edge for the at least one trimmer line.

14. The mowing head according to claim 13, wherein an inner width of the clamping section at the narrow longitudinal side is smaller than a minimum diameter of the at least one trimmer line.

15. The mowing head according to claim 13, wherein the mowing head comprises a conical section provided with the first and second trimmer line channels, wherein the conical section comprises at least partially a conical outer contour, wherein the deflection edge is displaced by a displacement into the housing relative to the conical outer contour, and wherein the displacement is at least approximately as large as a diameter of the at least one trimmer line.

* * * * *